(12) United States Patent
Petersson et al.

(10) Patent No.: US 8,631,780 B2
(45) Date of Patent: Jan. 21, 2014

(54) BALANCING ARRANGEMENT FOR MINIMIZING BENDING STRESS IN A POWER CUTTER ARM

(75) Inventors: Hans Petersson, Landvetter (SE); Mattias Holmdahl, Goteborg (SE); Anders Lundgren, Hisings Karra (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 13/989,373

(22) PCT Filed: Nov. 23, 2010

(86) PCT No.: PCT/SE2010/051289
§ 371 (c)(1),
(2), (4) Date: May 23, 2013

(87) PCT Pub. No.: WO2012/070989
PCT Pub. Date: May 31, 2012

(65) Prior Publication Data
US 2013/0239940 A1   Sep. 19, 2013

(51) Int. Cl.
*F02B 75/06*   (2006.01)

(52) U.S. Cl.
USPC ...................... 123/192.2; 125/13.01; 30/264

(58) Field of Classification Search
USPC ............ 123/192.1, 192.2; 30/264; 125/13.01
See application file for complete search history.

(56) References Cited

U.S. PATENT DOCUMENTS

| 4,836,297 | A | 6/1989 | Dorner et al. |
| 5,259,269 | A | 11/1993 | Swenson |
| 7,520,276 | B2 | 4/2009 | Jakobsson et al. |

FOREIGN PATENT DOCUMENTS

| DE | 19722933 A1 | 12/1997 |
| WO | 2012070989 A1 | 5/2012 |

OTHER PUBLICATIONS

International Search Report for International Application No. PCT/SE2010/051289, dated Jul. 5, 2011.
Written Opinion of International Application No. PCT/SE2010/051289, dated Jul. 5, 2011.
English Abstract of DE19722933 published Dec. 4, 1997; downloaded May 22, 2013.

*Primary Examiner* — Noah Kamen
(74) *Attorney, Agent, or Firm* — Novak Druce Connolly Bove + Quigg LLP

(57) ABSTRACT

A power cutter powered by a single cylinder internal combustion engine, the power cutter including: a tool unit having at least one tool, which can be rotated about an axis of rotation; a drive unit including an engine, the engine including an engine cylinder having a cylinder bore centerline, a piston, a crankshaft with a crankshaft axis of rotation and a flywheel, the crankshaft running in a counter clockwise direction as seen towards the flywheel; a cutter arm attached to the drive unit in its inner end and its outer end carrying the tool unit, a centerline of the cutter arm essentially follows a connection line between the axis of rotation of the tool and the axis of rotation of the crankshaft.

15 Claims, 4 Drawing Sheets

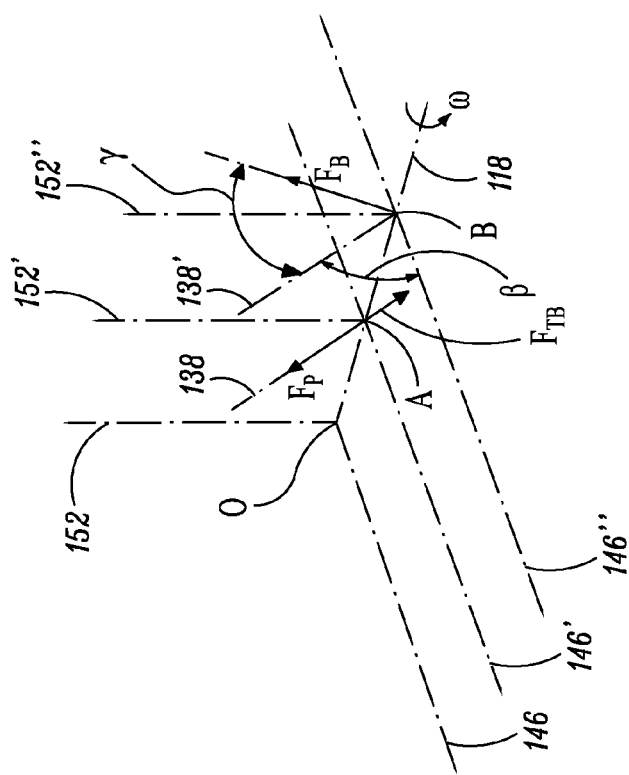
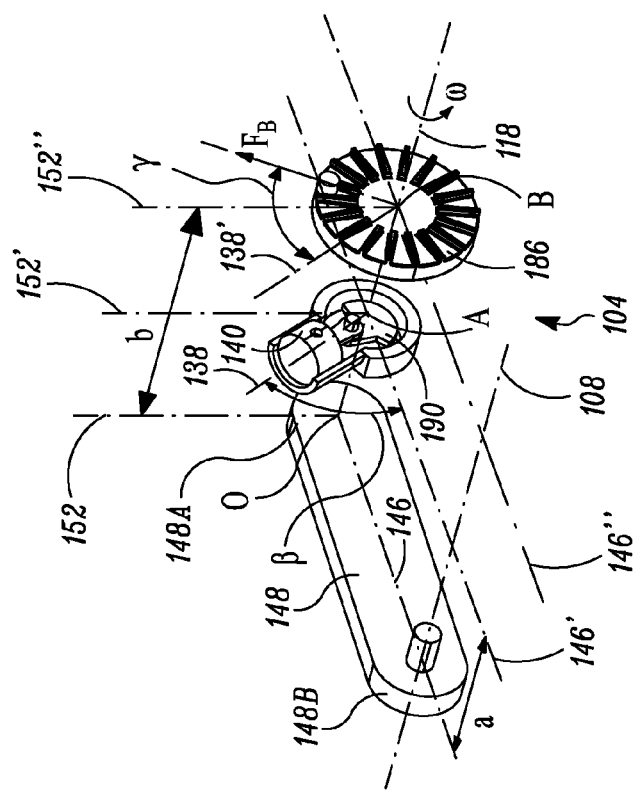

BALANCING ARRANGEMENT FOR MINIMIZING BENDING STRESS IN A POWER CUTTER ARM

CROSS-REFERENCE TO RELATED APPLICATIONS

This application is a national stage entry of PCT/SE2010/051289, which was filed on Nov. 23, 2010, said application is expressly incorporated herein in its entirety.

TECHNICAL FIELD

The present invention relates to a power cutter powered by a single cylinder internal combustion engine. The power cutter comprising: a tool unit having at least one working tool, which can be rotated about an axis of rotation, and preferably having a tool guard;

a drive unit comprising a single cylinder internal combustion engine, the engine comprising an engine cylinder with cylinder bore having a cylinder bore centerline, a piston, a crankshaft with at least one crank web and a crankshaft axis of rotation, a crankcase, a muffler and a flywheel, the crankshaft running in a counter clockwise direction as seen towards the flywheel;

a cutter arm attached to the drive unit in its inner end and its outer end carrying the tool unit, a centerline of the cutter arm essentially follows a connection line between the axis of rotation of the tool and the axis of rotation of the crankshaft.

BACKGROUND OF THE INVENTION

Balancing systems for single cylinder engines have been known a long time. If no balancing at all is applied inertia forces corresponding to the full weight of the piston including piston pin and a part of the crank rod will act up and down the longitudinal direction of the cylinder. By arranging the crank webs to provide an unbalance force of half the above weight in a counter direction, for short called half piston weight, the maximum unbalance force will be reduced to half but acting in all directions. This arrangement provides the lowest unbalance forces. If instead the crank webs provide an unbalance force equal to the full weight of the piston the result would be similar to no balancing, but the unbalance forces would in this case act only in a perpendicular direction to the direction of the cylinder and be of full size, i.e. corresponding to the weight of the piston. Therefore the full piston weight balancing will provide twice as high forces as the half piston weight balancing, but acting in only one direction.

Portable, hand-held power cutters powered by a single cylinder internal combustion engine are known since long. These machines are often used for cutting concrete and similar materials. Such a cutting creates a lot of abrasive particulate matter. Typically, efficient air cleaning is vital and is attained mainly through a filter assembly having a big filter volume, which may increase a service life of the machine. To create a big filter volume in a compact machine, power cutters have been introduced which have an engine cylinder which is leaned forwards. An example is Husqvarna K 750 and K760. This design is described in U.S. Pat. No. 7,520,276, assigned to Husqvarna AB and the disclosure of which is hereby incorporated by reference in this application.

However this kind of design layout has a forward leaning cylinder with a tilt angle ($\alpha$) that is between 5 degrees and 40 degrees in contrast to a more traditional design with a backwards leaning cylinder, i.e. with a negative tilt angle. Further the cutter arm points more upwards than in a traditional design. These differences contributes in creating an acute angle between the cutter arm centerline and the cylinder bore centerline, and this acute angle is larger than 45° but smaller than 75°. It is typically 55°-60°, compared to 80°-100° for a more traditional design. A result of all these differences is that the unbalance forces and torques created by the single cylinder engine gives a very different, more complex and more severe strain situation for the cutter arm. Especially this is true for an engine speed corresponding to a resonance frequency for bending the cutter arm.

U.S. Pat. No. 4,836,297 and its German counterpart DE 3 546 029 describe a balancing system for reducing handle vibrations of a power tool having a cylinder with a strong backwards tilt. Further its crankshaft has a counterbalancing structure with crank webs for counterbalancing the full weight of the piston. This creates high unbalance forces from the crank webs. These would need to be compensated by further big unbalances. All this creates extra stress in the structure, e.g. in a cutter arm. Also it is only possible to balance in a direction perpendicular to the cylinder axis, as the unbalance forces act in this direction. As the cutter arm normally does not run in this direction, such a balancing system can not minimize bending stress in the cutter arm, and the purpose was to reduce handle vibrations. Further this type of balancing creates extra weight in the crank webs and extra weight in a flywheel or clutch for compensating the extra weight in the crank webs. This is a disadvantage for a hand held machine.

U.S. Ser. No. 08/865,934 describes a balancing system for primarily reducing vibrations in the handles caused by reaction forces from the tool in a hand held machine also having a cylinder with a backwards tilt. This reduction of vibrations are also said to reduce stress in a hand held machine. Also this design uses a counterbalancing structure with crank webs having weights 20 for counterbalancing the full weight of the piston. This is evidenced by the description and FIG. 2 "the balance weights 20 compensate the forces from the piston which are directed in the direction of movement of the piston". Therefore it is only possible to balance in a direction perpendicular to the cylinder axis, as the unbalance forces act in this direction. As the cutter arm normally does not run in this direction, such a balancing system can not minimize bending stress in the cutter arm, but could of course reduce vibrations in the handles. And when testing a balancing as described it did not reduce stress in the cutter arm of a K750 or K760 power cutter, but only possibly to reduce maximum handle vibrations a little. So the recommendations of this document did not and can not solve the problem of reducing cutter arm fatigue, in fact it teaches away from a solution.

In light of the foregoing, there is a need for a solution reducing stress in the cutter arm of the above mentioned type of power cutters, which solution may have a simple design and a low weight or low weight increase.

BRIEF DISCLOSURE OF THE INVENTION

In view of the above, it is an objective to solve or at least reduce the problems discussed above. In particular, the objective is to provide an efficient solution for minimizing or at least reducing bending stress in the cutter arm and especially during engine speed corresponding to a bending resonance frequency of the cutter arm, which solution may have a simple design and a low weight or a low weight increase.

The objective is achieved with a novel, portable, hand-held power cutter, powered by a single cylinder internal combustion engine, according to claim 1, in which the crank web/s are arranged to counterbalance approximately half the weight of the piston and the flywheel is arranged so that it gives a radially outwards acting unbalance force $F_B$ during engine rotation (ω), and $F_B$ is provided at a flywheel angle (γ) in a clockwise direction in relation to the cylinder bore centerline when the piston is in a top dead center position, and the flywheel angle γ is larger than 20° but smaller than 110°.

According to claim 2 the cylinder bore is inclined in a forward direction towards the tool unit, such that the centre line of the cylinder bore forms a tilt angle (α) larger than zero to a base line perpendicular being perpendicular to a base line which is a line coinciding with a horizontal surface on which the power tool is resting in an upright position.

According to claim 3 the connection line or a parallel line forming a cylinder angle β with the cylinder bore centerline, and this cylinder angle β is larger than 45°, but smaller than 75°.

According to claim 4, the cutter arm is arranged to have a bending stiffness around a cutter arm perpendicular axis that is so high that a resonance frequency for bending the cutter arm corresponds to an engine speed higher than half the maximum speed of the power cutter.

According to claim 5, the resonance frequency for bending the cutter arm corresponds to an engine speed lower than 60% of the maximum speed of the power cutter, and preferably lower than 55%, but higher than 50% according to claim 4.

According to claim 6, the flywheel angle γ is larger than 30° but smaller than 100°, and preferably larger than 40° but smaller than 90°.

According to claim 7, the flywheel angle γ is larger than 50° but smaller than 80°, and preferably larger than 60° but smaller than 70°.

Other aspects, achievements and characteristic features of the invention are apparent from the appending claims and from the following description of preferred embodiments of the invention.

BRIEF DESCRIPTION OF THE DRAWINGS

In the following description of preferred embodiments, reference will be made to the accompanying drawings, in which.

FIG. 3 shows a schematic, exploded perspective view of a cutter arm, engine cylinder and flywheel with respective centerlines and angles between centerlines.

FIG. 4 shows a simplified view of FIG. 3, but showing all forces due to engine rotation.

DESCRIPTION OF A PREFERRED EMBODIMENT

Figure 1:
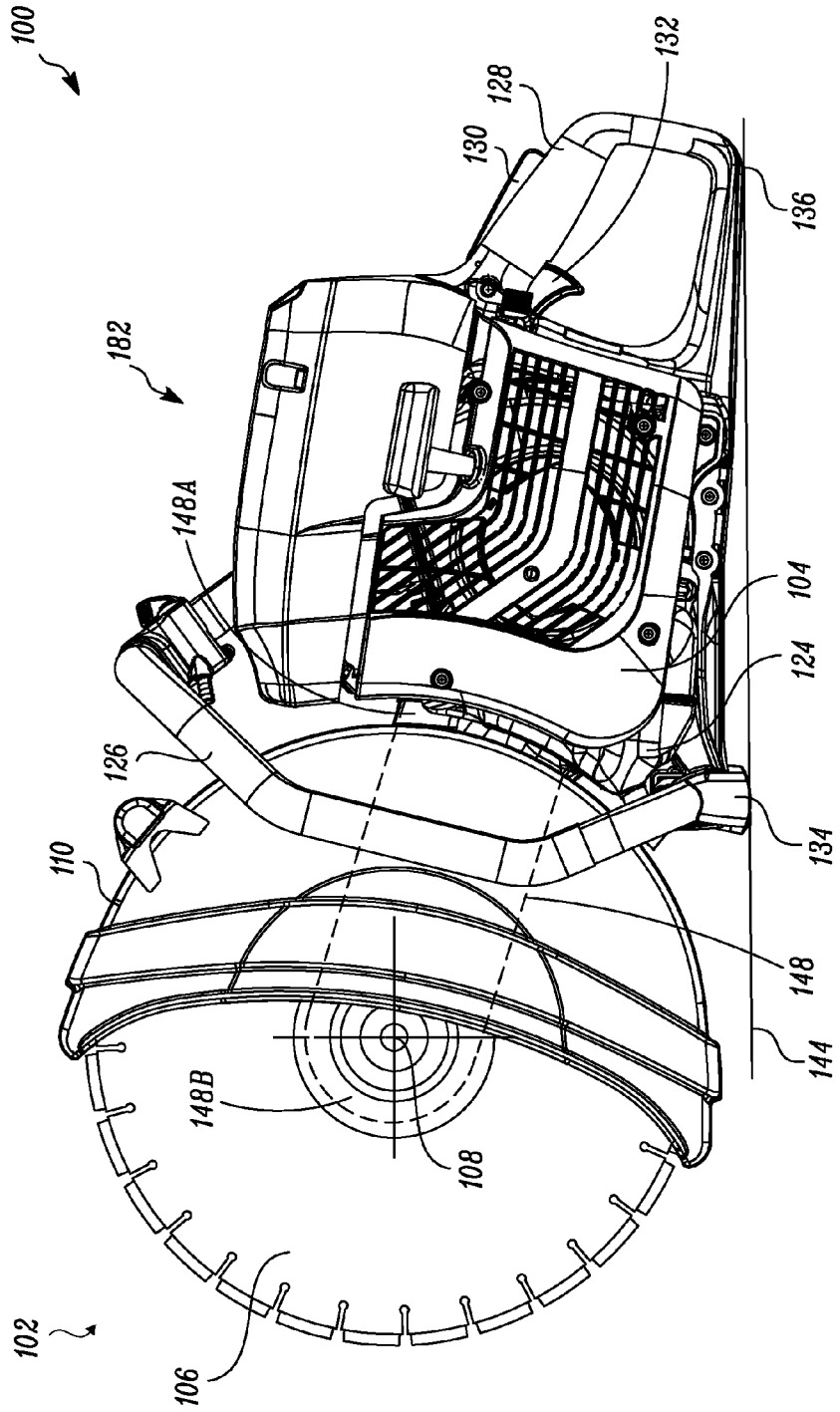
FIG. 1 shows a side elevation view of a portable, hand-held power cutter, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

Figure 2:
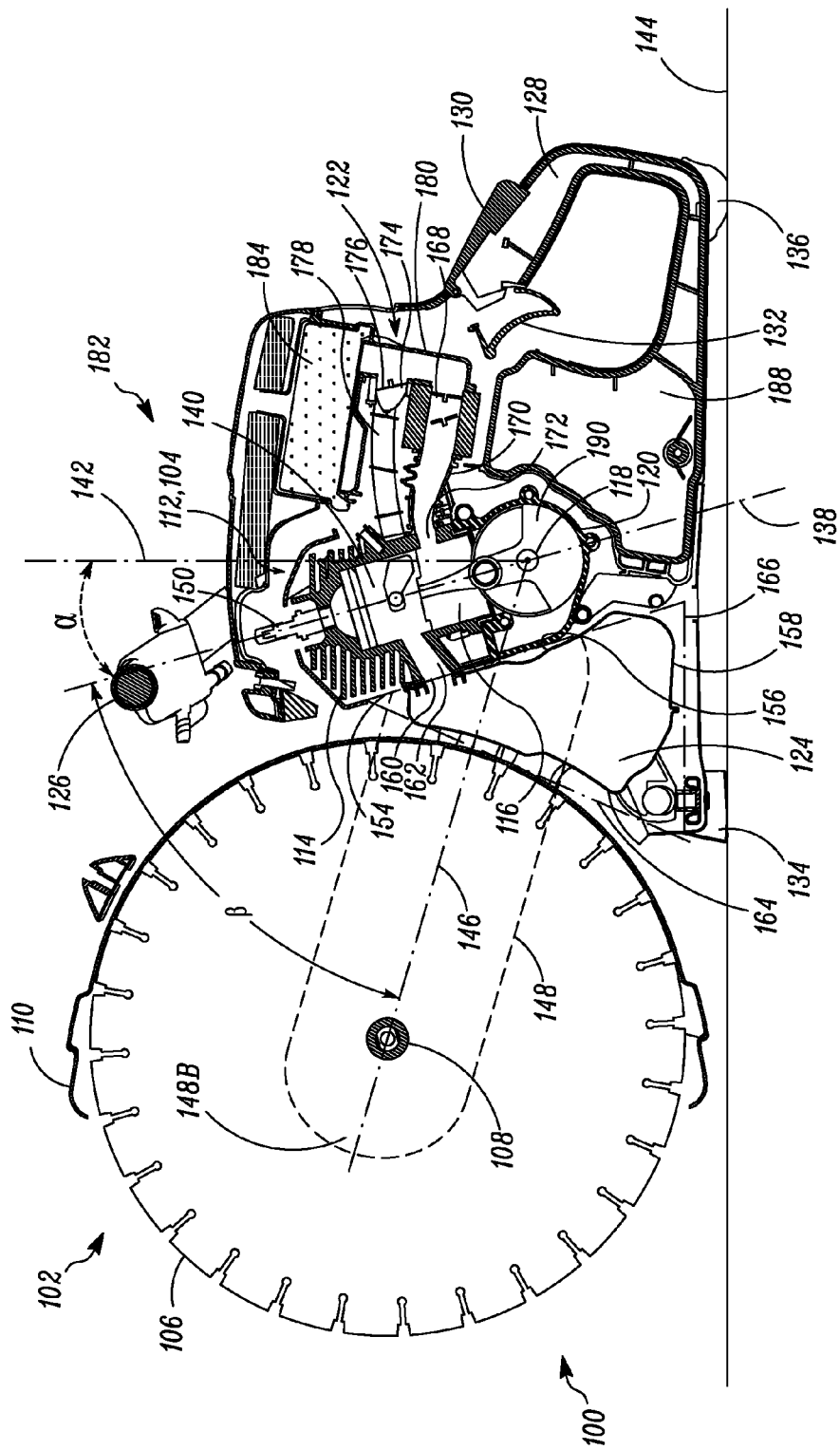
FIG. 2 shows a longitudinal cross-section of the power cutter in FIG. 1.

FIGS. 1 and 2 show an example portable hand-held power cutter 100 incorporating some aspects of the present invention.

The power cutter 100 may includes a tool unit 102 and a drive unit 104. The tool unit 100 is provided with a working tool 106. In an embodiment of the present invention, the working tool 106 may be a cutter disc with attached segments with diamonds to aid in a cutting of hard or abrasive materials. The working tool 106 is rotated about an axis of rotation 108 which may be perpendicular to the plane of the paper in the normal upraised position of the machine, as shown in FIG. 1. It is also possible to use two cutting discs located close to each other, to be used in a cut and break method, as described in U.S. Pat. No. 7,571,720, assigned to Husqvarna AB and the disclosure of which is hereby incorporated by reference in this application. Further, the tool unit 102 may also include a tool guard 110 in a conventional manner.

FIG. 2 shows a power cutter 100 according to the invention. The power cutter includes a tool unit 102 and a drive unit 104.

The drive unit 104 includes a two-stroke internal combustion engine 112 with an engine cylinder 114 with a cylinder bore 116, a crankshaft 118 and a crankcase 120, an assembly 122 for supplying air and fuel mixture to the engine, a muffler 124 and a flywheel 152. A holding and supply unit 162 is attached by springs or resilient means to the drive unit to provide a good anti vibration for the operator. This unit comprises handles 126, 128, controls 130, 132, and supports 134, 136 on the underside of the unit 162 for allowing upright positioning of the power tool 100 on a flat ground surface. Further it comprises a fuel tank 188 and a holding and supply unit 162 attached by springs or resilient means to the drive unit to provide a good anti vibration for the operator. A cutter arm 148 is attached to the drive unit 104 in its inner end 148A and carries the tool unit 102 in its outer end 148B. The cutter arm 148 also holds an endless driving belt used to transmit the power from the drive unit 104 to the cutter disc 106 in a manner known per se.

The centre line 138 of the engine cylinder 114 coincides with the axis of rotation 140 of the crankshaft 118. As shown in FIG. 2, the engine cylinder 114 and the crankcase 120 are tilted forwards by a tilt angle α between the centre line 138 of the engine cylinder 114 and a perpendicular line 142 to a base line 144 or base plane. In an embodiment of the present invention, the tilt angle α amounts to 15 degrees. The base plane 144 is the horizontal plane on which the front and rear supports 134 and 136 of the machine unit 104 are resting as shown in FIG. 1. It should be understood that the reference to the base line/plane 144 in order to describe the degree of tilt of the engine cylinder 114 and the crankcase 120 presupposes that the height of the supports 134 and 136 are moderate. If the front supports 134 would be much higher than the rear support 136, e.g., if the front support 134 would consist of long, unfoldable legs, while the rear support 136 is just a heel of no height or negligible height, the above definition of the tilt angle α does not provide true information about the degree of tilt of the engine cylinder 114 and crankcase 120 assembly. It should in this connection also be understood that the rear support 136 need not consist of a protrusion in the form of a heel or the like, but may as well consist of just a piece of the bottom of the machine unit 104, which contacts the ground or base plane 144. In various embodiments of the present invention, the angle α may vary between 5 degrees to 40 degrees.

Assuming that the axis of rotation 118 of the crankshaft is located at a level above the base plane 144, such that the level does not particularly deviate from what is normal practice in working machines of the present type, also a line 146, which extends between the axis of rotation 108 of the cutter disc 106 and the axis of rotation 118 of the crankshaft, can be used as a reference line for describing the degree of tilt of the engine 112. According to the invention, the angle β of inclination between the centre line 138 of the engine cylinder 114 and the said connection line 146 is larger than 45°, but smaller than 75°. Preferably the angle β is larger than 50° but smaller than 70°, and even more preferably larger than 52° but smaller than 65°, and still more preferably larger than 54° but smaller than 65°, and most preferably larger than 56° but smaller than 60°.

The top of the engine cylinder 114 is covered by a cap for directing cooling air to the cooling fins of the engine cylinder 114. A spark plug 150 of the engine 112 extends through a hole in the top of the cap and is pointing obliquely up In an embodiment of the present invention, a front side 154 of the tilted engine 112 (the engine cylinder 114 and the crankcase 120) is approximately parallel with the inclined centre line 138 of the cylinder bore 116. The front side 154, in other words, is also inclined, such that it forms an angle of about 75 degrees to the horizontal plane. This creates a space between the engine 112 and the disc guard 108 that has the substantial shape of a triangle. This space, which is available in the longitudinal direction between the engine 112 and the tool unit 102, especially the disc guard 110, represented by the said conceived triangle, is due to the tilt of the engine 112. Also the available space in the cross direction is considerable.

As shown in FIG. 2, the muffler 124 is accommodated in the above discussed, approximately triangular space, and is designed such that it will substantially occupy this space. The resulting shape of the muffler, in a cross section of the muffler, corresponding to the central, longitudinal, vertical section of the machine, can also be described as the shape of a longitudinal section of a pear. A major part of a rear side 156 of the muffler is parallel with the front side 154 of the tilted engine 112. The bottom section of the muffler 124 widens forward as well as rearwards, including a bottom part 158 which extends rearwards partially under the crankcase 120. In this configuration, the muffler 124 is accommodated in a close and side by side relationship with the engine cylinder 114, i.e. not located above or below the engine cylinder.

The muffler 124 and the engine cylinder 114 are placed in a close and side by side relationship. An inlet 160 is provided in a rear side 156 of the muffler 124, in "the tip of the pear", facing an exhaust port 162 of the engine cylinder 114. This is a convenient location of the inlet 160, as the exhaust gases are directed down into a voluminous body of the muffler 124. The exhaust gas leaves the muffler 124 through an outlet pipe in the bottom, left part of the muffler 124.

The pear-like shape of the muffler 124 in the section shown in FIG. 1 also means that the contour of the muffler 124 in said cross section has a point of balance (centre of gravity) in the main bottom part of the muffler 124, i.e. at a fairly low level. As a matter of fact, the point of balance of the muffler 124 will adopt a position well below the level of the axis of rotation 118 of the crankshaft, and even below the entire crankcase 120, when the power tool 100 is in an upright position. This feature indicates that the muffler 124 indeed is located at a level in the power tool 100 which is unconventionally low.

Moreover, the assembly 122 for the supply of air and fuel mixture to the engine 112 is accommodated in a space, between the fuel tank 182 and the filter system. The assembly 122 includes a carburettor 168 and an intake pipe 170 extending between the carburettor and an induction port 172 of the engine cylinder 114. The engine 112, according to the preferred embodiment, is a crankcase scavenged two-stroke internal combustion engine employing air head technique. Therefore, the engine cylinder 114 is provided with transfer ducts (not shown), which have ports in the engine's cylinder wall, and therefore the assembly 122 also includes an air inlet 174 equipped with a restriction valve 176 and two parallel connecting ducts 178 leading to connecting ports in the cylinder wall and via piston recesses to the transfer channels. So called reed valves could also be used. Additional air is therefore supplied to the transfer channels from the air inlet 174 via at least one connecting duct 178 located in the vicinity of the intake pipe 170. The tilted cylinder is an advantage considering the extra space available for filters and intake system.

The carburettor 168, which is of a conventional type including a gas valve and a choke valve, the air inlet 174 with the restriction valve 176, the intake pipe 170 and the connecting ducts 178 are assembled and mounted on a bracket 180. The bracket 180 in turn is mounted in a rear part of the space (between the fuel tank and the filter system), near a rear wall of the machine. Due to this and the because of a considerable longitudinal extension of the space between the fuel tank and the filter system 110, which is promoted by the inclination of the engine cylinder 114 allows the carburettor 168 to be located at a fairly large distance from the cylinder 144, and also allows the connecting ducts 178 to be fairly long. Both these features are important. A relatively "cold" location of the carburettor 168 at quite a distance from the hot cylinder promotes good hot restart performance of the engine, and long connecting ducts 178 promote a proper functioning of the air-head technique. Also it is an advantage that the flexible intake duct 170 and the flexible connecting ducts 178, normally made of rubber or similar, are long as they connect a vibrating, moving drive unit 104 with a more stable, anti vibrated, holding and supply unit 166.

The filter system can include a pre-filter provided in an upper filter chamber and always a main filter 184 provided under the rear part of the pre-filter and enclosed in a lower filter chamber defined by the pre-filter, a frame 186 which extends downwards from a bottom part of the pre-filter, and a horizontal part of the bracket 180. The upper and lower filter chambers communicate via a passage 190 through the bottom part of the pre-filter.

As said FIG. 3 shows a schematic, exploded perspective view of a cutter arm, engine cylinder and flywheel with respective centerlines and angles between centerlines. The drive unit 104 is shown very schematically with just a cylinder 114, a piston 140, a crankcase 120 and parts of a crankshaft having a crankshaft axis 118. The crankshaft rotates in a counterclockwise direction ω. A flywheel 186 is fastened to the crankshaft as well as a clutch and a drive belt pulley. This is however fully conventional and is therefore not described any more. The cutter arm 148 is fastened with its inner end 148A to the crankcase 120. Inside the cutter arm (not shown) there is a drive belt that drives a tool shaft, with an axis of rotation 108. The tool shaft and a tool guard 110 are both attached to an outer end 148B of the cutter arm in a conventional way. Normally cutting blades of 200-400 mm diameter are used. Of course these blades are heavy, up to about 3 kg, and are rotated at speeds up to about 4500 revolutions per minute, i.e. approximately half the engine speed. Some power cutters instead have two smaller blades, e.g. Husqvarna K760 Cut-n-break. As a simplified explanation the outer end of the cutter arm 148B can be seen as held fixed by the weight of the tool guard 110 and the rotating blade and its gyroscopic effect while its inner end 148A is vibrated by the running engine. A connection line 146 through the center of the cutter arm 148 runs between the tool axis of rotation 108 and the crankshaft axis of rotation 118, having a center (O) in the center of the cutter arm. A parallel line 146' to the connection line 146 runs through the center of the engine at a distance (a). The center of the engine is where the cylinder bore center line 138 meets the crankshaft axis of rotation 118. This center of the engine is called (A). A second parallel line 146" to the connection line 146 runs through a flywheel center (B) at a distance (b). A cutter arm perpendicular 152 runs through center (O) in a perpendicular direction to connection line 146. Parallel lines 152' and 152" run through center (A) and center (B) respectively. When the engine runs a number of unbalance forces $F_P$ and $F_{TB}$ will act at center (A), as seen in FIG. 4. When the piston is located at a Top Dead Center (TDC) as shown, the inertia force $F_P$ from the piston 140 will be at a maximum and be directed upwards along the cylinder centerline 138. When the piston is instead located at a Bottom Dead Center (BDC), the inertia force $F_P$ from the piston 140 will instead be at a maximum but be directed downwards along the cylinder centerline 138. When the piston goes away from either TDC or BDC the respective forces will decrease and be zero halfway between TDC and BDC, i.e. after 90 degrees of crankshaft rotation. This creates a strong unbalance, so the engine tends to vibrate up and down along the cylinder centerline 138. A typical balancing effort is to arrange the crank so it produces a counter force $F_{TB}$ acting from a position directly opposite the crank pin. It is sometimes arranged as an unbalance weight corresponding to half the weight of the piston 140 including piston pin, piston pin bearing and the weight of the upper part of the piston rod. For short this will be called a half piston weight in the description, abstract and claims, and twice this will be called a full piston weight. At TDC and BDC the resulting maximum force will therefore be $F_P$–$F_{TB}$ and correspond to the half piston weight. But please observe that the force $F_{TB}$ rotates with the crankshaft around crankshaft axis 118, while the force $F_P$ only acts along the cylinder centerline 138. Each force $F_P$ and $F_{TB}$ will create a torque, having a torque arm of a, around the cutter arm perpendicular 152. It was surprisingly found that by arranging the flywheel 186 to create an unbalance force $F_B$ at a special flywheel angle γ, measured in a clockwise direction from the cylinder centerline 138,138', a bending stress measured in the cutter arm 148 could be strongly reduced, especially when measuring at an engine speed corresponding to a resonance frequency for bending the cutter arm 148. Continued testing revealed that a maximum positive effect occurred when the flywheel angle γ was larger than 60°, but smaller than 70°. But a small positive effect could be noticed even when the flywheel angle was larger than 20° but smaller than 110°. The flywheel unbalance center (B) is arranged at a distance (b) from center (O), where (b) is normally twice as long or more than twice as long as (a). The unbalance force $F_B$ can be created by an extra weight on the flywheel or a drill recess on the opposite side, or preferably by thicker wings on one side of the flywheel, as it normally also works as a cooling fan for the engine. $F_B$ will of course rotate counter-clockwise with engine rotation ω. Center (B) is located at a distance (b) from (O). The unbalance force $F_B$ will therefore create an unbalance torque around (O) of $F_B$×(b), and this torque will rotate as the flywheel rotates. Roughly speaking this means that an unbalance force corresponding to the half piston weight and acting through (A) in a first direction along parallel line 146' produces a torque around cutter arm perpendicular 152 having torque arm (a). A counter torque created at (B) having torque arm (b) is $F_B$×(b), and will act in an appr. opposite direction along 146" to the unbalance force acting along 146'. As (b) is much longer than (a), $F_B$ is much smaller than the unbalance force acting through A. Such a torque balancing for the direction of the cutter arm is not possible for an unbalanced engine or for a fully balanced engine, as discussed concerning the prior art documents. It works well for the half piston weight balancing engine, and worse when leaving this. Therefore the balancing should be for 0.25-0.75 piston weight balancing, and preferably for 0.3-0.7, and more preferably for 0.35-0.65, and still more preferably for 0.4-0.6, and most preferably for 0.45-0.55 piston weight balancing. As the engine runs with a normal speed of 8000-10 000 revolutions per minute, equivalent of 133-167 revolutions per second, normally a bending amplitude in the cutter arm is extremely small. But this is distinctly different when the engine speed corresponds to a resonance frequency for bending of the cutter arm. In this case much bigger amplitudes and resulting bending stress can develop. Therefore it is preferable that this engine speed is kept above half of the maximum engine speed, so that it will occur only once in the engine speed range. But preferably it should also be kept well away from the normal working speed range, like 60% or preferably 55% of the maximum speed. Please also observe that this is not a traditional balancing to reduce engine vibrations. Instead more unbalance force will be added that will increase the total maximum unbalance force. Instead this negative effect will be set off by a much greater positive effect in greatly reducing the maximum bending stress in the cutter arm, especially at a resonance engine speed.

This type of power cutter layout with a forward leaning cylinder has many advantages. A lot of space is created behind the cylinder for air cleaning. The power cutter is still kept very compact and short. A strong reason for this is a very special arrangement of the muffler 124 or 302, see FIGS. 2 and 5. The muffler is arranged in a very low position where it does shorten the distance between the tool guard 110 and the most forward part of the engine cylinder 114. Therefore the cutter arm 148 is shortened. This lowers the bending stresses in the cutter arm and raises the resonance frequency for bending, while maintaining a low weight for the cutter arm and the whole power cutter. All this is very important. The muffler 124, 302 is essentially accommodated in a space which has the substantial shape of a triangle in a cross section of said space perpendicular to the crankshaft axis of rotation 118 and located behind the tool guard 110, which triangle has one corner pointing upwards when the power cutter has an upright position, a front side 164 facing the tool unit 102, a base side 166 facing a base line 144 and a rear side 154, that is also a front side of the engine cylinder.

Figure 5:
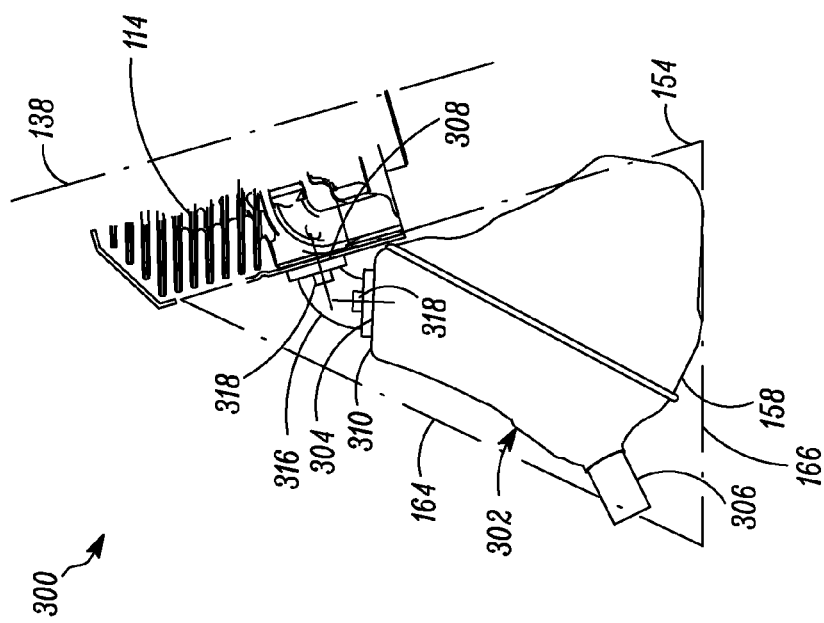
FIG. 5 is a partial side view of FIG. 2, showing however a somewhat different muffler attached to the same engine cylinder.

FIG. 5 shows a special muffler 302 that is also arranged essentially within a triangle with sides 164, 166 and 154. This muffler has an improved cooling of gases entering the muffler through a strongly cooled intake pipe 316. Also the exhaust 310 and exhaust duct of the engine cylinder 114 is especially strongly cooled. This is important as engine seizures often start through high temperatures in this critical part of the cylinder. This design could be described or claimed as follows:

A muffler 302 is accommodated in a close and side by side relationship with the engine cylinder 114, i.e. not located above or below the engine cylinder; the muffler 302 comprises an exhaust gas inlet 304 and an exhaust gas outlet 306, such that the exhaust gas inlet 304 is adapted to receive the exhaust gases from the exhaust port 308 of the engine cylinder 114;

Especially the exhaust gas inlet 304 is provided on a substantially top 310 or bottom 312 or a local side of the muffler;

the muffler 304 is arranged to be in communication with the exhaust port 308 of the engine cylinder 114 by means of a pipe 316 for improving an air flow around the pipe 316 and around the exhaust port 308 of the engine cylinder 114 to thereby lower the temperature of the exhaust port 308 of the engine cylinder 114 and the exhaust gases entering the exhaust gas inlet 304 of the muffler 302.

A further advantage is that the pipe 316 provides a more flexible top attachment of the muffler 304. This also makes it possible to make a second and possibly third attachment/support of the muffler more flexible. Hereby the engine vibration, i.e. the drive unit 104 vibration, can be altered. This will also provide a positive effect for the cutter arm stresses.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A power cutter powered by a single cylinder internal combustion engine, the power cutter comprising:
   a tool unit having at least one working tool, which can be rotated about an axis of rotation, and preferably having a tool guard;
   a drive unit comprising a single cylinder internal combustion engine, the engine comprising an engine cylinder with cylinder bore having a cylinder bore centerline, a piston, a crankshaft with at least one crank web and a crankshaft axis of rotation, a crankcase, a muffler and a flywheel, the crankshaft running in a counter clockwise direction as seen towards the flywheel;
   a cutter arm attached to the drive unit in its inner end and its outer end carrying the tool unit, a centerline of the cutter arm essentially follows a connection line between the axis of rotation of the tool and the axis of rotation of the crankshaft;
   the crank web/s are arranged to counterbalance approximately a half piston weight and the flywheel is arranged so that it gives a radially outwards acting unbalance force FB during engine rotation, and FB is provided at a flywheel angle in a clockwise direction in relation to the cylinder bore centerline when the piston is in a top dead center position, and the flywheel angle is larger than 20° but smaller than 110° in order to at least minimize or reduce cutter arm bending stress.

2. The power cutter according to claim 1, wherein the cylinder bore is inclined in a forward direction towards the tool unit, such that the center line of the cylinder bore forms a tilt angle larger than zero to a base line perpendicular being perpendicular to a base line which is a line coinciding with a horizontal surface on which the power tool is resting in an upright position.

3. The power cutter according to claim 1, wherein the connection line or a parallel line forming a cylinder angle with the cylinder bore centerline, and this cylinder angle is larger than 45°, but smaller than 75°.

4. The power cutter according to claim 1, wherein the cutter arm is arranged to have a bending stiffness around a cutter arm perpendicular axis that is so high that a resonance frequency for bending the cutter arm corresponds to an engine speed higher than half the maximum speed of the power cutter.

5. The power cutter according to claim 4, wherein the resonance frequency for bending the cutter arm corresponds to an engine speed lower than 60% of the maximum speed of the power cutter, and preferably lower than 55%.

6. The power cutter according to claim 1, wherein the flywheel angle is larger than 30° but smaller than 100°, and preferably larger than 40° but smaller than 90°.

7. The power cutter according to claim 1, wherein the flywheel angle is larger than 50° but smaller than 80°, and preferably larger than 60° but smaller than 70°.

8. The power cutter according to claim 1, wherein the muffler is essentially accommodated in a space which has the substantial shape of a triangle in a cross section of said space perpendicular to the crankshaft axis of rotation and located behind the tool guard, which triangle has one corner pointing upwards when the power cutter has an upright position, a front side facing the tool unit, a base side facing a base line and a rear side, that is also a front side of the engine cylinder.

9. The power cutter according to claim 1, wherein the muffler is accommodated in a close and side by side relationship with the engine cylinder, i.e. not located above or below the engine cylinder; the muffler comprises an exhaust gas inlet and an exhaust gas outlet, such that the exhaust gas inlet is adapted to receive the exhaust gases from the exhaust port of the engine cylinder;
   the exhaust gas inlet is provided on a substantially top side of the muffler;
   the muffler is arranged to be in communication with the exhaust port of the engine cylinder by means of a pipe providing a more flexible attachment of the muffler to the drive unit.

10. The power cutter according to claim 1, wherein the cylinder angle is larger than 50° but smaller than 70°, and preferably larger than 52° but smaller than 65°.

11. The power cutter according to claim 1, wherein the cylinder angle is larger than 54° but smaller than 62°, and preferably larger than 56° but smaller than 60°.

12. The power cutter according to claim 1, wherein the tilt angle is between 5 degrees and 40 degrees.

13. The power cutter according to claim 1, wherein the crank web/s are arranged to counterbalance more than 0.25 and less than 0.75 times a full piston weight.

14. The power cutter according to claim 1, wherein the crank webs are arranged to counterbalance more than 0.3 and less than 0.7 times the full piston weight, and preferably more than 0.35 and less than 0.65 times the full piston weight.

15. The power cutter according to claim 1, wherein the crank webs are arranged to counterbalance more than 0.4 and less than 0.6 times the full piston weight, and preferably more than 0.45 and less than 0.55 times the full piston weight.

* * * * *